Oct. 23, 1945.  C. M. ROE  2,387,410
PIPE COUPLING
Filed Sept. 22, 1943  3 Sheets-Sheet 1

INVENTOR.
Chester M. Roe
BY
Clark & Ott
ATTORNEYS

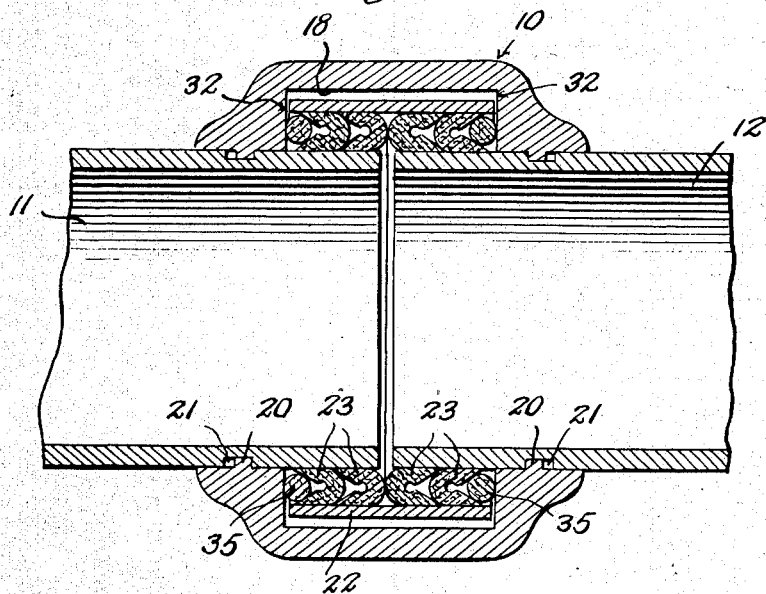
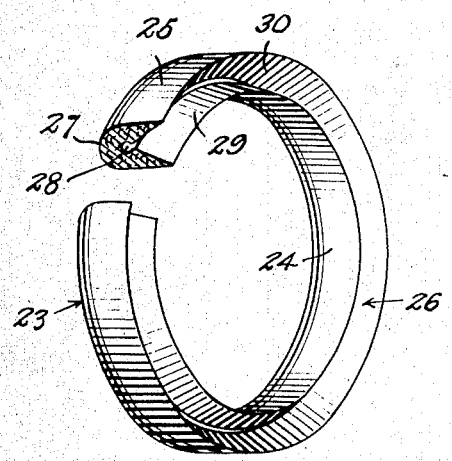

Oct. 23, 1945.  C. M. ROE  2,387,410

PIPE COUPLING

Filed Sept. 22, 1943  3 Sheets-Sheet 3

INVENTOR.
Chester M. Roe
BY
Clark & Ott
ATTORNEYS

Patented Oct. 23, 1945

2,387,410

UNITED STATES PATENT OFFICE 2,387,410

PIPE COUPLING

Chester M. Roe, Hasbrouck Heights, N. J.

Application September 22, 1943, Serial No. 503,319

5 Claims. (Cl. 285—194)

This invention relates to pipe couplings for connecting together the adjacent ends of pipes and for sealing the same to prevent leakage at the coupled ends while permitting of the expansion and contraction of the pipes.

The invention has in view a coupling for connecting together pipes adapted for conveying fluids under pressure or suction and the principal object thereof is the provision of a tubular housing for coupling the adjacent ends of the pipes and improved means disposed within the housing in surrounding relation to and spanning the adjacent ends of the pipes for sealing the same.

The invention more particularly comprehends a sealing means including a sleeve disposed in surrounding relation to the adjacent ends of the pipes and arranged in inwardly spaced relation to the face of an internal annular groove formed in the tubular housing and deformable sealing rings disposed between the sleeve and the pipes in surrounding relation with the pipes at the opposite ends of the sleeve for sealing the space between the sleeve and the pipes adjacent the ends of the sleeve to thereby prevent leakage at the coupled ends of the pipes.

As a further feature the invention embodies deformable nested sealing rings having opposite side faces of general concavo-convex formation in cross-section which are arranged with the convex face of one ring disposed in engagement with concave face of the adjacent ring so as to expand the inner and outer faces of the rings against the outer faces of the pipes and the inner faces of the sleeve to thereby seal the space between the sleeve and the pipes at the opposite ends of the sleeve.

With the foregoing and other objects in view reference is now made to the following specification and accompanying drawings in which are illustrated the preferred forms of the invention.

In the drawings:

Fig. 3 is a view similar to Figure 1 illustrating the arrangement of the sealing rings for pipes conveying a fluid by suction.

Fig. 4 is a perspective view of one of the sealing rings partly broken away.

Figure 1:
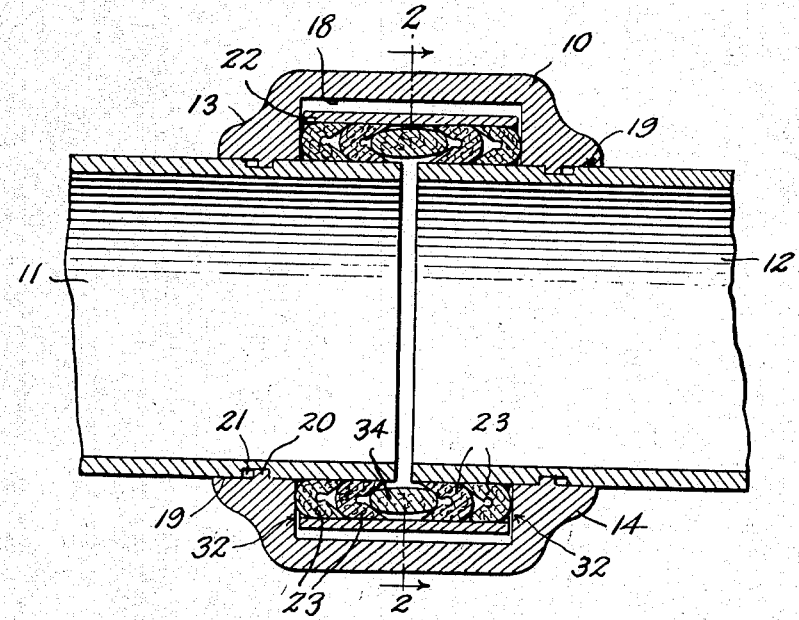
Fig. 1 is a longitudinal sectional view of a coupling constructed in accordance with the invention and illustrating the same in coupled relation upon the adjacent ends of pipes shown in section.
Figure 2:
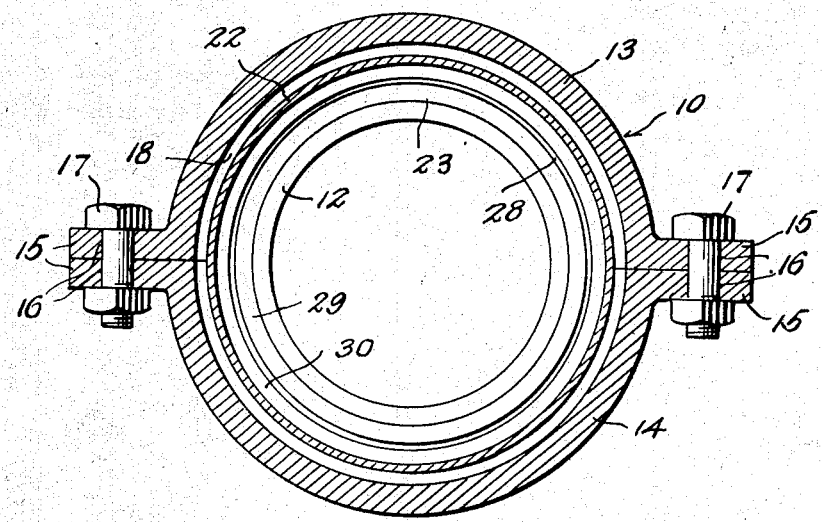
Fig. 2 is a transverse sectional view taken approximately on line 2—2 of Figure 1 with the spacing ring omitted.

Referring to the drawings by characters of reference, the coupling includes a housing 10 for connecting the adjacent ends of pipes 11 and 12 in a pipe line in which fluids such as water, oil, steam and the like are conveyed. The housing 10 may be of any desired construction for engagement with the adjacent ends of the pipes to prevent relative separation thereof while permitting of the expansion and contraction of the pipes and as illustrated the housing is of the split type consisting of mating semi-cylindrical sections 13 and 14 having outwardly projecting flanges 15 at the opposite ends thereof which are provided with openings 16 adapted to receive bolts 17 for securing the sections in annular formation surrounding the ends of the pipes with the pipes disposed in slightly spaced end to end relation.

The housing 10 is formed with an internal annular groove 18 and on opposite sides thereof the housing is provided with a cylindrical inner periphery 19 and inwardly projecting radial ribs 20 adapted to engage in grooves 21 in the outer faces of the pipes respectively so as to prevent separation of the pipes while the grooves 21 being relatively wider than the ribs 20 allows for movement of the pipes due to expansion and contraction thereof.

In order to provide a seal within the housing 10 which effectively prevents the escape or leakage of the fluid in the pipes, a metallic sleeve 22 is provided which is disposed in the annular groove 18 of the housing in spaced relation to and spanning the adjacent ends of the pipes. The sleeve is also disposed in spaced relation to the face of the groove 18 and is supported in said spaced relation by packing which preferably is in the form of deformable sealing rings 23 and which are located within the sleeve 22 adjacent the ends thereof in surrounding relation with the pipes.

The rings 23 have inner and outer cylindrical faces 24 and 25 and opposite side faces 26 and 27 of general concavo-convex formation in cross-section. The concave side face 26 includes a central face portion 28 consisting of a continuous annular groove of circular formation in cross-section and opposite outwardly diverging face portions 29 and 30 which extend from the opposite edges of said groove to the inner and outer cylindrical faces 24 and 25 respectively so as to define flaring walls between the concave face 26 and the said inner and outer cylindrical faces.

In pipe lines conveying fluid by pressure the the sealing rings 23 are arranged in nested relation with two or more disposed in surrounding relation with each pipe and with the convex faces of the outermost rings disposed in bearing engagement against the side walls 32 of the groove 18 as shown in Figure 1 of the drawings. While two rings 23 are shown on each pipe in the embodiment illustrated, it is to be understood that additional rings may be employed if desired. The rings are nested so that the convex face 27 of one ring is impinged by the pressure of the fluid in the pipe line against the outwardly divergent face portions 29 and 30 of the concave face 26 of the adjacent outer ring to thereby expand the flaring walls of the ring outwardly and dispose the inner and outer cylindrical faces 24 and 25 thereof tightly against the pipes and the inner face of the sleeve respectively.

The inner rings 23 are maintained in spaced relation on the pipes 11 and 12 respectively by means of a separator ring 34 preferably of elliptical formation in cross-section which is positioned with the curved opposite side edges thereof disposed between and engaging against the concave faces of said inner rings. The said separator ring is spaced from the inner face of the sleeve 22 and the outer faces of the pipes so that the fluid being conveyed by the pipes will fill the space surrounding the ring and will exert outward pressure against the concave faces of the inner rings 23. The said pressure which produces the flow of the fluid in the pipes, thus functions to expand the divergent walls of the inner rings so as to cause the inner and outer cylindrical faces 24 and 25 thereof to impinge against the pipes and the inner face of the sleeve. The said pressure will also compress the inner rings 23 against the adjacent outer rings respectively to thereby expand the divergent walls of the outer rings so as to impinge the inner and outer cylindrical faces thereof against the pipes and the inner face of the sleeve.

In Figure 3 of the drawings the coupling is illustrated in its application to pipe lines adapted to convey fluids by suction. In this embodiment of the invention the housing 10 and sleeve 22 are similarly arranged as in the previous form of the invention. The sealing rings 23 are also of similar formation, the same however are positioned within the sleeve with the concave faces of the outer rings disposed outermost and with the convex faces thereof engaging against the outwardly divergent faces 29 and 30 of the concave faces of the adjacent inner rings respectively. The convex faces of the inner rings are in abutting engagement in this embodiment of the invention and a spacing ring 35 of substantially circular formation in cross-section is arranged between the outer sealing rings and the side faces 32 of the groove 18 of the housing 10.

The pipe line being under suction to convey the fluid in this form of the invention, the rings 23 function to seal the connections joining the pipes by the atmospheric pressure on the concave faces of the outer rings which pressure expands the divergent walls thereof thereby impinging the inner and outer cylindrical faces of the rings against the pipes and the inner face of the sleeve. The outer rings 23 are also compressed against the adjacent inner rings to thereby similarly impinge the inner and outer cylindrical faces thereof against the pipes and the inner face of the sleeve respectively.

In pipe lines adapted for conveying liquids by both pressure and suction such as by pumping the same under pressure into a receptacle or the like and by pumping the liquid out of the receptacle by suction, sealing rings 36 are employed which are so arranged as to provide outward expansion of the flaring walls of the outer rings by the atmospheric pressure exerted against the concave faces thereof and for outward expansion of the flaring walls of the inner rings by the pressure in the pipe line exerted against the concave faces of said inner rings.

Figure 5:
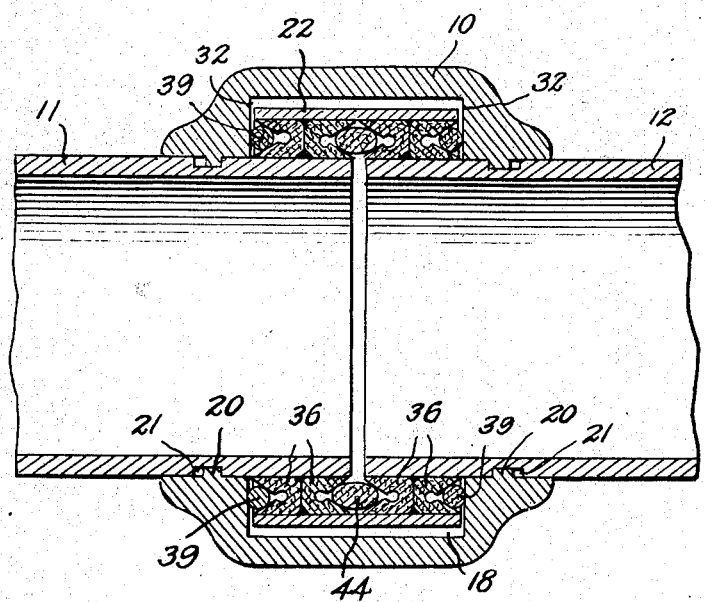
Fig. 5 is a view similar to Figure 1 illustrating the arrangement of the sealing rings for sealing the connections in pipe lines conveying liquids either under pressure or suction.
Figure 6:
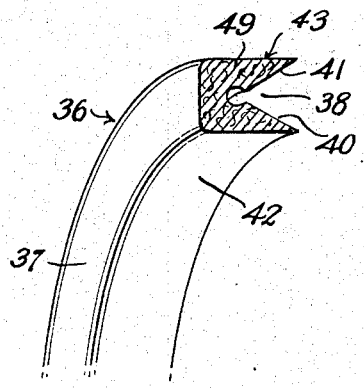
Fig. 6 is a fragmentary perspective view of one of the sealing rings illustrated in section in Figure 5.

In this embodiment of the invention the sealing rings 36 are disposed as illustrated in Figures 5 and 6 of the drawings in which the outer rings are arranged with their concave faces disposed outwardly and in confronting relation with the side faces 32 of the groove 18 in the housing 10 and in which the inner sealing rings are arranged with their concave faces disposed inwardly and in confronting spaced relation with each other. In this form of the invention the sealing rings 36 are similar in formation to the sealing rings 23 employed in the previously described forms of the invention with the exception that instead of the convex side face the sealing rings 36 each have a plane side face 37 disposed opposite the concave side face 38 thereof. By this formation and arrangement the inner and outer sealing rings 36 on each of the pipes 11 and 12 are disposed with their plane side faces 37 in abutting relation.

A spacing ring 39 similar to the spacing ring 35 employed in the previously described form of the invention is interposed between each of the outer sealing rings 36 and the confronting side face 32 of the groove 18, the same engaging against the divergent face portions 40 and 41 of the concave faces 38 of the sealing rings and functioning to space the said rings from the side faces 32 of the groove 18 so that atmospheric pressure will be exerted against the said divergent face portions of the concave faces 38 of the outer sealing rings when the pipe line is conveying liquid by suction. The atmospheric pressure thus exerted against the concave faces of the outer sealing rings expands the flaring walls thereof to effect the impingement of the inner and outer cylindrical faces 42 and 43 thereof against the pipes and the inner face of the sleeve 22, thus sealing the connection when the pipe line is pumping under suction.

A separator ring 44 similar to the separator ring 34 of one of the previously described forms of the invention is interposed between the inner sealing rings 36 in surrounding spaced relation to the adjacent ends of the pipes 11 and 12 and in spaced relation to the sleeve 22 whereby the space between the inner sealing rings surrounding the separator ring 44 will be filled with the liquid when the same is being conveyed by the pipe line by pressure. The pressure in the pipe line thus exerted against the divergent face portions 40 and 41 of the concave faces 38 of the inner sealing rings expands the flaring walls thereof to effect the impingement of the inner and outer cylindrical faces 42 and 43 of the inner sealing rings about the pipes and against the inner face of the sleeve 22, thus sealing the connection when the pipe line is under pressure.

The sealing rings 23 and 36, the separator rings 34 and 44 and the spacing rings 35 and 39 are preferably constructed from woven sheet material of asbestos or cotton duck by compressing and moulding strips of said material into the configurations shown and described. The same may be formed in elongated strips and cut as desired into shorter lengths and looped to form split rings or the rings may be produced in endless annular form when moulded. The rings may also be moulded or otherwise formed of rubber composition or of synthetic material such as neoprene.

What is claimed is:

1. In a coupling for connecting and sealing the adjacent ends of pipes, a sleeve surrounding the adjacent ends of the pipes in spaced relation thereto, a tubular housing secured at its opposite ends to the pipes respectively in surrounding relation therewith and having an annular groove in its inner periphery intermediate its ends in which groove the said sleeve is arranged in spaced relation to the bottom thereof, and deformable sealing rings disposed between the sleeve and the pipes in surrounding relation with the pipes and impinging against the inner face of the sleeve and the outer faces of the pipes to thereby seal the sleeve in surrounding relation to the adjacent ends of the pipes and prevent leakage at the coupled ends of the pipes.

2. In a coupling for connecting and sealing the adjacent ends of pipes, a sleeve surrounding the adjacent ends of the pipes in spaced relation thereto, a tubular housing secured at its opposite ends to the pipes respectively in surrounding relation therewith and having an annular groove in its inner periphery intermediate its ends in which groove the said sleeve is arranged in spaced relation to the face of the groove, packing located adjacent each end of the sleeve and disposed between the sleeve and the pipes in surrounding relation with the pipes for sealing adjacent the ends of the sleeve the space between the sleeve and the pipes to thereby prevent leakage at the coupled ends of the pipes and a spacing ring disposed in spaced relation from the sleeve and abutting against the packing to permit pressure within the housing to be exerted against the packing.

3. In a coupling for connecting and sealing the adjacent ends of pipes, a metallic sleeve surrounding the adjacent ends of the pipes in spaced relation thereto, a tubular split housing tightened about the adjacent ends of the pipes and having an annular groove in its inner periphery intermediate its ends and in which groove the said sleeve is arranged in spaced relation to the face of the groove, and deformable sealing rings having inner and outer cylindrical faces and opposite side faces of concavo-convex formation in cross-section arranged within the sleeve with a plurality thereof disposed at each end thereof in surrounding relation with the outer faces of the pipes respectively and with the convex face of one ring disposed in engagement with the concave face of the adjacent ring for expanding the inner and outer faces of the rings against the outer faces of the pipes and the inner face of the sleeve respectively to thereby seal at the ends of the sleeve the space between the sleeve and the pipes to prevent leakage at the coupled ends of the pipes.

4. In a coupling for connecting and sealing the adjacent ends of pipes, a sleeve surrounding the adjacent ends of the pipes in spaced relation thereto, a tubular housing secured in surrounding relation to the adjacent ends of the pipes and having an annular groove in its inner periphery intermediate its ends in which groove the said sleeve is arranged in spaced bridging relation to the said pipes and deformable sealing rings having inner and outer cylindrical faces, a convex side face and an opposite side face having outwardly divergent face portions in cross-section, said rings being arranged within the sleeve with a plurality thereof disposed at each end in surrounding relation with the pipes respectively and with the convex faces of the outermost rings engaging against the side faces respectively of the said groove and with the convex faces of the remaining rings disposed in engagement with the divergent face portions of the adjacent outer rings for expanding by the pressure in the pipe line exerted against the innermost rings the said divergent face portions to thereby impinge the inner and outer faces of the rings against the pipes and the inner face of the sleeve respectively and the thrust of said rings against the side faces of the groove and a separator ring interposed between the innermost rings in surrounding spaced relation to the pipes.

5. In a coupling for connecting and sealing the adjacent ends of pipes in a pipe line conveying fluid by suction, a sleeve surrounding the adjacent ends of the pipes in spaced relation thereto, a tubular housing secured in surrounding relation to the adjacent ends of the pipes and having an annular groove in its inner periphery intermediate its ends in which groove the said sleeve is arranged in spaced bridging relation to the said pipes and deformable sealing rings having inner and outer cylindrical faces and each having a convex side face and an opposite side face of general concave formation in cross-section with outwardly divergent face portions, said rings being arranged within the sleeve with a plurality thereof disposed at each end in surrounding relation with the pipes respectively and with the convex faces of the inner rings disposed in abutting engagement and with the convex faces of the remaining rings disposed in engagement with the divergent face portions of the adjacent inner rings for expanding by the atmospheric pressure exerted against the outer rings the said divergent face portions to thereby impinge the inner and outer faces of the rings against the pipes and the inner face of the sleeve respectively and a spacing ring interposed between the concave outer faces of the outer rings and the side faces of said groove respectively.

CHESTER M. ROE.